United States Patent [19]

Choma et al.

[11] Patent Number: 4,644,818
[45] Date of Patent: Feb. 24, 1987

[54] DIFFERENTIAL APPARATUS WITH SIDE-GEAR-CENTERED CENTER CAM

[75] Inventors: Alvin A. Choma, Grosse Pointe Farms; Timothy R. Edwards, Warren, both of Mich.

[73] Assignee: Tractech, Inc., Warren, Mich.

[21] Appl. No.: 665,969

[22] Filed: Oct. 29, 1984

[51] Int. Cl.$^4$ ............................................. F16H 35/04
[52] U.S. Cl. ........................................ 74/650; 74/710
[58] Field of Search ................. 74/710, 710.5, 711, 74/650

[56] References Cited

U.S. PATENT DOCUMENTS

| | | | |
|---|---|---|---|
| 1,430,744 | 10/1922 | Lewis | 74/650 |
| 2,329,058 | 9/1943 | Knoblock | 74/650 |
| 2,329,059 | 9/1943 | Knoblock | 74/650 |
| 2,638,794 | 5/1953 | Knoblock | 74/650 |
| 2,667,087 | 1/1954 | Myers | 74/650 |
| 2,830,466 | 4/1958 | Myers | 74/650 |
| 3,397,593 | 8/1968 | Knoblock | 74/650 |
| 3,651,907 | 3/1972 | Myer, Sr. | 192/43 |
| 3,791,238 | 2/1974 | Bokovoy | 74/650 |
| 4,249,429 | 2/1981 | Denning | 74/711 |
| 4,400,996 | 8/1983 | Schou | 74/711 X |
| 4,424,725 | 1/1984 | Bawks | 74/711 X |
| 4,524,640 | 6/1985 | Neumann et al. | 74/650 |

FOREIGN PATENT DOCUMENTS 401746 11/1933 United Kingdom ................. 74/650

*Primary Examiner*—Allan D. Herrmann
*Assistant Examiner*—David Novais
*Attorney, Agent, or Firm*—Laubscher & Laubscher

[57] ABSTRACT

The improved differential apparatus includes an annular center cam member having an internal radially-inwardly directed alignment shoulder the opposite end surfaces of which are engaged by the adjacent ends of the side gears, respectively, which side gears include external annular flanges the remote surfaces of which abut the differential housing end walls, respectively, thereby to accurately position the center cam member relative to the annular center driver member, whereby the use of a snap ring for centering the center cam member relative to the center driving member is avoided. In the illustrated embodiment, the use of conventional holdout rings is avoided, thereby reducing the complexity and cost of the apparatus.

5 Claims, 14 Drawing Figures

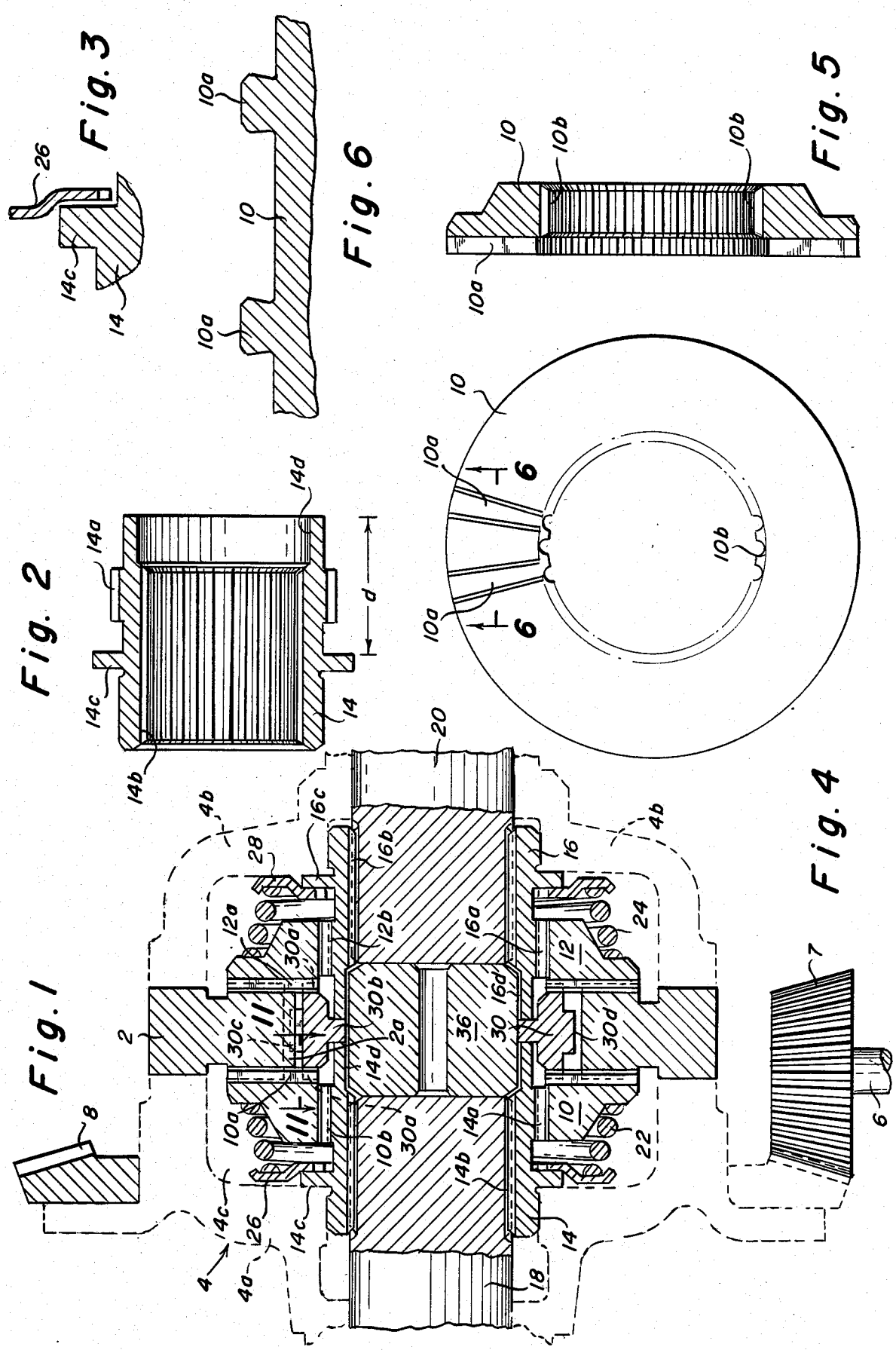

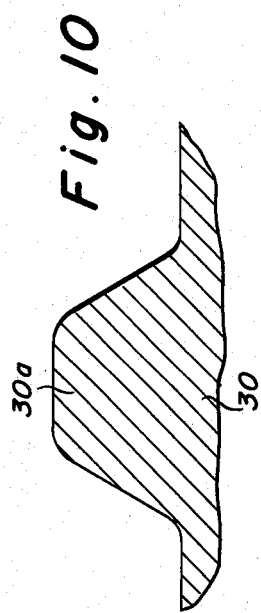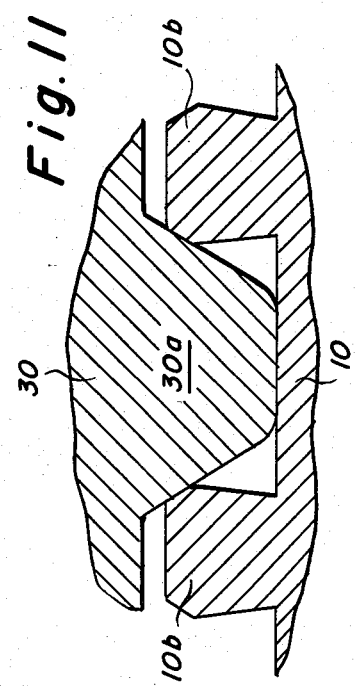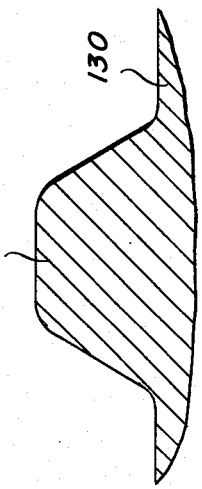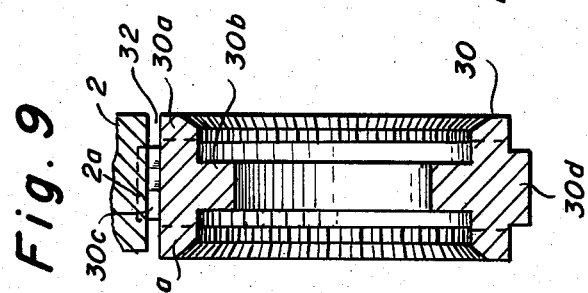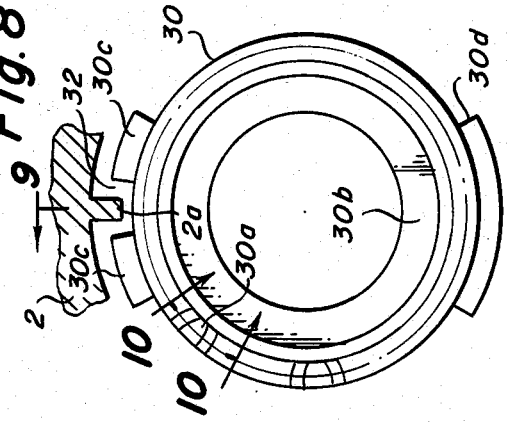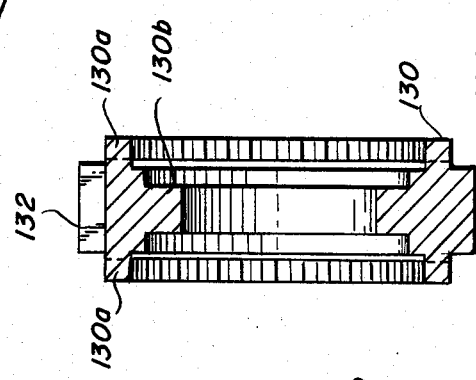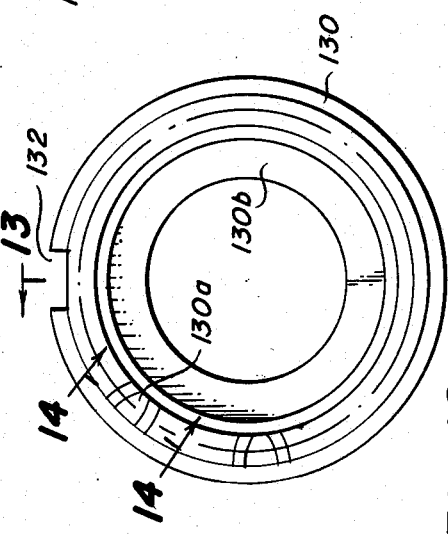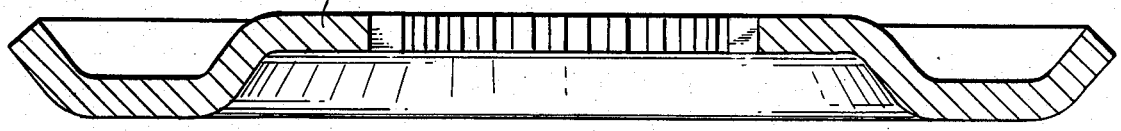

DIFFERENTIAL APPARATUS WITH SIDE-GEAR-CENTERED CENTER CAM

BRIEF DESCRIPTION OF THE PRIOR ART

Differential mechanisms for driving a pair of output shafts from an input drive shaft are well known in the patented prior art, as taught by the patents to Knoblock U.S. Pat. Nos. 2,329,059, 2,638,794 and 3,397,593, Myers U.S. Pat. Nos. 2,667,087, 2,830,466 and 3,651,907, and Bokovoy U.S. Pat. No. 3,791,238, for example. As evidenced by these patents, it is conventional in the art to provide holdout rings that are angularly displaceable between clutch-engaging and clutch-disengaging positions relative to a center driver member or spider to maintain in a temporarily disengaged condition a clutch member associated with a driven shaft that overruns the other driven shaft (as might occur, for example, when a motor vehicle is making a turn). When the overrunning condition is terminated, the holdout ring is angularly returned to its initial position relative to the center driver member, whereupon the associated clutch member is again spring-biased into engagement with the center driver member.

The use of a snap ring for centering the center cam member relative to the center driver member is shown in the aforementioned Myers and Bokovoy patents, and the patent to Knoblock U.S. Pat. No. 2,329,059, and in the Knoblock U.S. Pat. No. 3,397,593, the center cam member is centered relative to the center driver member by control cams on each side of the center cam.

Continued efforts have been made to improve the operation and to reduce the cost of such differential mechanisms. The present invention was developed to provide an improved differential mechanism of the center cam type in which the use of a snap ring is avoided in addition to avoiding the use of the holdout rings.

SUMMARY OF THE INVENTION

A primary object of the present invention is to provide a differential mechanism which includes a center cam member that is centered within the driver member by the side gears, thereby to permit the elimination of the conventional snap ring. In accordance with a characterizing feature of the invention, the center cam member includes on its inner periphery an annular centrally-arranged radially-inwardly directed centering flange the end surfaces of which are abutted by the adjacent ends of the side gears, respectively. The side gears, in turn, are provided with external stop flanges the remote end surfaces of which abut the adjacent end walls of the housing chambers, respectively, thereby to accurately position the center cam member relative to the driver member whereby the use of a snap ring may be eliminated.

A more specific object of the invention is to provide a differential apparatus of the type described above, wherein the use of the conventional holdout rings is avoided. Consequently, the complexity and cost of manufacture is greatly reduced owing to the elimination of the holdout rings, the holdout ring grooves in the clutch members, the holdout ring slots in the center cam, the snap ring between the center cam and spider members, and the snap ring groove in the spider and center cam members. The clutch members may be in the "as forged" condition, with broaching only of the internal spline configuration. Moreover, the tight tolerance machining previously required on the center cam shoulders when holdout rings are used is eliminated. The side gear inner hub length is reduced to provide positive positioning with the annular radially-inwardly directed extension on the center cam member. Thus, the number of operating or component parts is reduced, simple efficient operation is achieved, and tolerance stack up control is less sensitive without holdout ring provisions on the components.

DESCRIPTION OF THE DRAWING

Other objects and advantages of the invention will become apparent from a study of the following specification, when viewed in the light of the accompanying drawing, in which:

FIG. 1 is a detailed longitudinal sectional view of the improved differential apparatus;

FIG. 2 is a longitudinal sectional view of one of the side gears of the apparatus of FIG. 1;

FIG. 3 is a detailed view of the support shoulder of the side gear of FIG. 2;

FIGS. 4 and 5 are front elevation and longitudinal sectional views, respectively, of one of the clutch members of FIG. 1, and FIG. 6 is a sectional view taken along line 6—6 of FIG. 4;

FIG. 7 is a sectional view of one of the spring retainer elements of FIG. 1;

FIG. 8 is a front elevational view of the powdered metal center cam member of FIG. 1, and FIGS. 9 and 10 are sectional views taken along lines 9—9 and 10—10, respectively of FIG. 8;

FIG. 11 is a detailed sectional view taken along line 11—11 of FIG. 1;

FIG. 12 is a front elevational view of a second machined center cam embodiment; and FIGS. 13 and 14 are sectional views taken along lines 13—13 and 14—14, respectively, of FIG. 12.

DETAILED DESCRIPTION

Referring first more particularly to FIG. 1, the differential mechanism of the present invention includes an annular center driver member or spider 2 mounted in the casing or housing 4 illustrated in phantom, which casing includes sections 4a and 4b bolted together to retain the center driver, the casing being driven by drive shaft 6 via pinion 7 and ring gear 8. At each end, the center driver member includes driving teeth that are normally engaged by corresponding clutch teeth 10a, 12a on annular clutch members 10 and 12, respectively. The clutch members 10 and 12 are concentrically mounted on, and are splined by spline teeth 10b, 14a and 12b, 16a for axial displacement relative to, side gears 14 and 16, respectively, which side gears are non-rotatably splined by spline teeth 14b and 16b to output shafts 18 and 20, respectively. The clutch members 10 and 12 are normally biased inwardly toward the center driver member 2 by helical compression springs 22 and 24 that react between spring retainers 26 and 28 and the clutch members 10 and 12, respectively.

Mounted concentrically within the center driver member 2 is an annular center cam member 30 formed of powdered metal sintered iron and having at opposite ends cam teeth 30a which are in engagement with portions of clutch teeth 10a and 12a that are radially inwardly located relative to those clutch teeth portions that engage the teeth of the center driver member 2. In accordance with a characterizing feature of the present invention, the center cam member 30 is provided on its inner periphery with a radially inwardly directed annular centering or stop shoulder 30b the opposite ends of which are abutted by the adjacent ends of the side gears 14 and 16, respectively, as shown in FIG. 1. Referring to FIGS. 8 and 9, the center cam member 30 is keyed for limited angular displacement relative to the center driver member 2, the center driver member being provided with an internal axially extending key 2a that extends radially inwardly within an oversized slot 32 contained in external weight means 30c mounted on the outer periphery of the center cam member 30. Diametrically-arranged weight means 30d are provided for counterbalancing the slot-defining flange means 30c.

Referring now to FIG. 2, the side gear 14 inclludes external spline teeth 14a that are engaged by the internal spline teeth 10b of the axially-displaceable clutch member 10, and internal spline teeth 14b for non-rotatably connecting the side gear with output shaft 18. The side gear is provided also with an external annular support flange 14c that serves both as a support shoulder for the annular spring retainer 26, and as an abutment for engaging the adjacent end wall of the housing chamber 4c, as shown in FIG. 1. If desired, the end portion of the side gear adjacent the center cam member may be provided with a counterbored portion 14d having a smooth cylindrical internal surface for receiving one end of an optional cylindrical spacer member 36 arranged between the adjacent ends of output shafts 18 and 20. The side gear 16 has a corresponding configuration.

As shown in FIG. 7, the spring retainer 26 has an internal spline which permits it to be slipped from the right hand end of the side gear over the spline teeth 14a to a position in engagement with the support shoulder 14c. The spring retainer is provided with internal splines for receiving the splines 14a and 16a as the spring retainer is mounted axially upon the side gear. The spring retainer 28 has a corresponding structure.

OPERATION

Assuming that the differential mechanism is in its normal operating condition illustrated in FIG. 1, rotation of the drive shaft 6 produces driving of the output shafts 18 and 20 at equal rotational velocities via ring gear 8, center driving member 2, clutch members 10 and 12, and side gears 14 and 16. Since the distance d (FIG. 2) between the spring retainer support flanges 14c and 16c are equally spaced from the stop surfaces at opposite ends of the center cam internal centering or stop shoulder 30b, equal biasing forces are applied to the clutch members 10 and 12 by the helical springs 22 and 24, which are utilized to return the clutches to engagement with the center driver.

In the event that the rotational velocity of the left output shaft 18 exceeds that of the right output shaft 20 (as might occur when the vehicle takes a right turn), the center cam member 30, which is already angularly displaced relative to the center driver member, causes the clutch teeth 10a (FIG. 11) of clutch member 10 to ride up the sides of the center cam teeth 30a to cam out the clutch member 10 relative to the driver member and thereby disengage the clutch teeth portions 10a from the corresponding driving teeth of the center driver member 2. The clutch member 10 is maintained in a disengaged indexed condition until the turning of the vehicle is completed and the rotational velocities of the driven shafts are equalized, whereupon the differential returns to its normal operating condition. Consequently, it will be seen that the differential operates without the use of holdout rings, and the center cam member is accurately centered within the driving member by the cooperation of the adjacent ends of the side gears with the center cam radially inwardly extending stop shoulder 30b.

In the alternate center cam embodiment of FIGS. 12-14, the oversized slot 132 for receiving the internal key on the center driver member is formed directly in the center cam body 130. In this embodiment, the center cam body is formed of machined 8620 steel.

One advantage of the invention is that the clutch members may be used in an "as forged" condition, since only the internal spline configuration need be broached. Thus, the expense of the holdout rings and the cost of machining the holdout ring grooves in the clutch members are eliminated. Furthermore, substantial cost reduction results from the reduced number of components, and simple efficient operation is achieved with increased reliability. Finally, as a consequence of the elimination of the holdout rings, tolerance stackup control is less sensitive.

What is claimed is:

1. In a differential mechanism for driving a pair of colinearly arranged output shafts (18,20) from an input shaft (6), including
   (a) a housing (4) containing a chamber defining opposed end walls containing aligned openings for receiving said output shafts, respectively;
   (b) an annular driver member (2) arranged in said chamber in concentrically spaced relation about the longitudinal axis of the output shafts;
   (c) clutch means normally effecting a driving connection between said driver member and said output shafts, respectively, said clutch means including a pair of annular side gears (14,16) mounted on the adjacent ends of said output shafts, respectively, a pair of driven clutch members (10,12) mounted for axial displacement on said side gears on opposite sides of said driver member, respectively, said driven clutch members having clutch teeth (10a, 10b) operable to engage corresponding driving teeth at opposite ends of said driver member, respectively, and spring means (22,24) biasing said driven clutch members inwardly in the clutch-engaging direction toward said driver member;
   (d) center cam means operable when one of said output shafts overruns the other for disengaging from said driver member the driven clutch member associated with the overrunning shaft, said center cam means comprising:
      (1) an annular center cam member (30) concentrically mounted within said driver member and between said clutch members, said center cam member including at opposite ends cam teeth (30a) for engaging portions of the clutch teeth of the adjacent clutch members, respectively; and
      (2) means (2a, 32) connecting said center cam member for limited angular displacement between clutch-engaging and clutch disengaging positions relative to said driver member, the cam teeth on said center cam member being operable to cooperate with the associated clutch teeth to cam out to the disengaged condition the clutch member associated with the overrunning shaft;
   the improvement which comprises (e) means for positioning said center cam member at a central position relative to said driver member, including
  (1) an annular integral centering flange (30b) centrally arranged on the inner periphery of said center cam member and extending radially inwardly between said side gears;
  (2) the adjacent ends of said side gears being in abutting engagement with the end faces of said centering flange, respectively, said side gears including external annular support shoulders (14c, 16c) the remote surfaces of which abut the adjacent housing end wall surfaces, respectively, thereby to accurately center said center cam member relative to said driving member;
  (3) said limited angular displacement connecting means including
    (a) an axially-extending internal rib (2a) on said driver member that extends radially inwardly from the internal periphery of said driving member;
    (b) said cam member including on its outer periphery an oversized axially-extending slot (32) receiving said rib, thereby to limit the angular displacement of said cam member relative to said driving member, said cam means being operable solely to maintain the clutch member associated with the overrunning shaft in the disengaged indexed condition as long as that shaft is in the overrunning condition.

2. Apparatus as defined in claim 1, wherein said clutch members are connected for axial displacement on the adjacent ends of said side gears, respectively; and further wherein said spring means comprises
  (1) a pair of spring retainer members (26, 28) mounted concentrically about said side gears in contiguous engagement with the adjacent faces of said support shoulders, respectively; and
  (2) a pair of helical compression springs (22, 24) mounted between said spring retainer members and the associated clutch members, respectively, said compression springs being operable to apply uniform biasing forces to said clutch members, respectively.

3. Apparatus as defined in claim 2, wherein each of said side gears includes internal (14b, 16b), and external (14a, 16a) spline teeth for connecting said side gear with the associated output shaft and with the associated clutch member, respectively.

4. Apparatus as defined in claim 3, wherein the adjacent end portions of said side gears include counterbores 14d, 16d having smooth internal cylindrical surfaces; and further including
  (f) a cylindrical spacer member (36) arranged concentrically within said center cam member for engagement at opposite ends by said output shafts, respectively, said spacer member extending at opposite ends within said side gear counterbored portions, respectively.

5. Apparatus as defined in claim 1, wherein said housing includes a plurality of sections (4a, 4b) connected to form a rigid housing.

* * * * *